United States Patent
Waaler et al.

(10) Patent No.: US 6,810,586 B1
(45) Date of Patent: Nov. 2, 2004

(54) CONTROL ARM AND METHOD FOR MANUFACTURING

(75) Inventors: Rune Waaler, Raufoss (NO); Trygve Ruste, Raufoss (NO)

(73) Assignee: Raufoss Technology AS, Raufoss (NO)

( * ) Notice: Subject to any disclaimer, the term of this patent is extended or adjusted under 35 U.S.C. 154(b) by 0 days.

(21) Appl. No.: 10/111,931

(22) PCT Filed: Nov. 3, 2000

(86) PCT No.: PCT/NO00/00367

§ 371 (c)(1),
(2), (4) Date: Aug. 23, 2002

(87) PCT Pub. No.: WO01/32979

PCT Pub. Date: May 10, 2001

(30) Foreign Application Priority Data

Nov. 3, 1999 (NO) .......................... 19995376

(51) Int. Cl.$^7$ .............................................. B21D 53/88
(52) U.S. Cl. .................... 29/897.2; 29/558; 72/334; 280/124.134
(58) Field of Search ................. 280/124.134; 29/897.2, 29/558, 557; 72/340, 341, 367.1, 369, 338, 333, 334

(56) References Cited

U.S. PATENT DOCUMENTS

| | | | |
|---|---|---|---|
| 4,057,263 A | 11/1977 | Schwuchow et al. | |
| 5,163,603 A | 11/1992 | Richart | |
| 5,169,055 A | * 12/1992 | Peterson et al. | ........... 29/897.2 |
| 5,362,090 A | * 11/1994 | Takeuchi | ............. 280/124.152 |
| 5,662,349 A | * 9/1997 | Hasshi et al. | ......... 280/124.134 |
| 5,800,024 A | 9/1998 | Steimmel et al. | |
| 6,070,445 A | 6/2000 | Holierhoek | |
| 6,122,948 A | * 9/2000 | Moses | ....................... 29/897.2 |

OTHER PUBLICATIONS

"A Practical Guide to Low–Cost Production", A Handbook of Product Design for Manufacturing; copyright 1986, McGraw–Hill.

* cited by examiner

*Primary Examiner*—David P. Bryant
(74) *Attorney, Agent, or Firm*—Stites & Harbison PLLC; William E. Jackson

(57) ABSTRACT

The present invention involves a control arm for use in the wheel suspension of a car. The arm is produced from a hollow, closed profile of high strength, extruded aluminium. The arm is produced in a wholly cold process, similar to the one used to produce aluminium fenders, involving stretch-bending, pressing, cutting and punching of the aluminium profile into the desired shape. The arm has a closed and smooth shape; in addition, it has a rib on its outer surface for fending off water and snow.

6 Claims, 5 Drawing Sheets

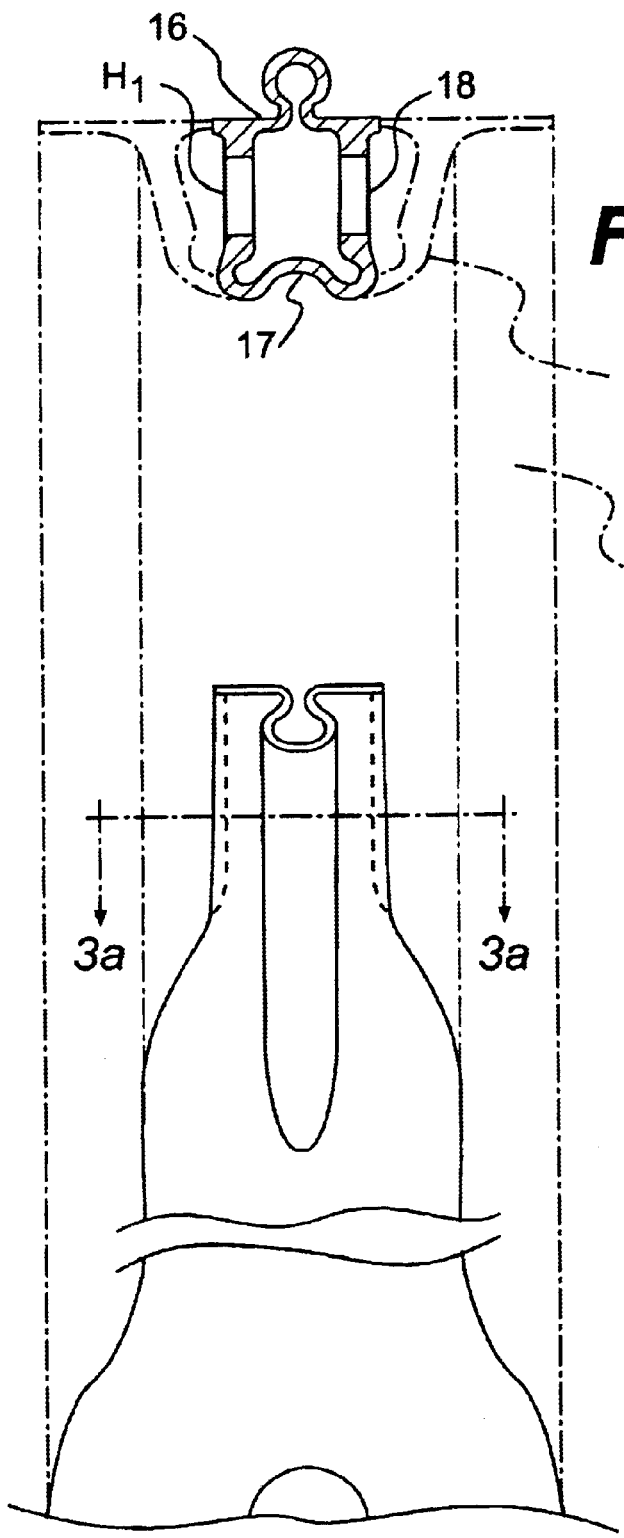
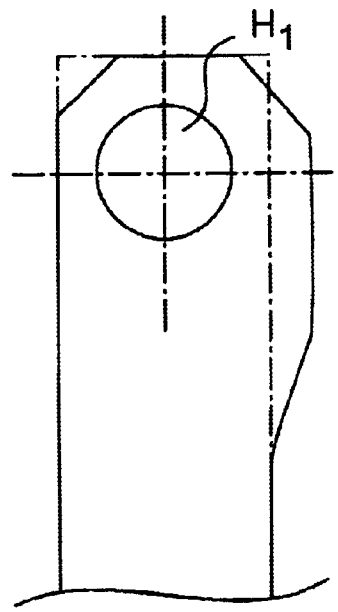
FIG. 3A
LOCAL SHAPING
CUT OUTS
FIG. 3B
FIG. 3

CONTROL ARM AND METHOD FOR MANUFACTURING

FIELD OF THE INVENTION

The present invention relates to a control or link arm for use in the wheel suspensions of cars, and in particular a control arm made from aluminium, and a method for its manufacture.

PRIOR ART

Traditionally, control arms are made from steel. The arms are manufactured by stamping separate details of the arm out of steel sheets and pressing them into their desired shape. The separate elements are welded together into a hollow arm, which is then painted. These are techniques that have been in use for more than a century. The necessary equipment for making components for the suspension of cars according to this method is in wide use, and the method is standard in all industrialised countries. This means that components manufactured according to this method are cheap, and all the more so, since the raw materials are cheap as well.

However, these components and their method/means of manufacture also have their drawbacks. First, the steel components are relatively heavy. This is a drawback, since car manufacturers try to keep the weight of the movable components in vehicular wheel suspensions as light as possible to improve road handling. They also try to keep the overall weight of car down, to reduce fuel consumption. The manufacturers try to reduce the weight problem by stamping holes in the sheet material to lighten the component. Superfluous material is then removed, where this can be done without adversely affecting the strength of the component. However, the hollow component with its cut-outs are apt to collect snow and dirt in the harsh environment under the car. Humid dirt collects in pockets in the construction, which subsequently become growth sites for rust. The manufacturing process requires rather expensive tools. In addition, the component is made from several elements, and the separate steps in the production; stamping, welding and painting, have to be handled separately, that is, they cannot be handled in a single production line. If the manufacturer wants to change the form of the component, new dies must be made for the presses; this makes the change costly.

U.S. Pat. No. 5,800,024 describes back suspension constructions for vehicles, made from aluminium. Several of the embodiments shown are made from aluminium profiles, comprising a number of individual sub-components welded together into the finished product. The drawback of this technique is that the production becomes more complicated, demanding a very accurate shaping and welding of each individual sub-component. The sub-components have to be shaped very accurate if an automated production line is to be used. This relates also to the less important parts of the construction, i.e. sub-components that will experience little loading or not includes mounts, etc. Further, welding of aluminium is a difficult operation that has to be done in an inert atmosphere. Welding of loaded components is generally undesirable, as the structure of the material is impaired and the component becomes weakened and less corrosion resistant. In order to compensate for this weakening, the dimensions, i.e. the wall thickness, have to be increased. Thus, some of the weight reducing benefit of aluminium is lost.

U.S. Pat. No. 6,060,445 describes a control arm produced by hydro forming. In a hydro forming process, an elongated hollow tube, which can be of aluminium, is closed at both ends, placed in a hydro forming press with dies whereupon the tube is filled with a hydraulic fluid. The tube will expand under the pressure from the hydraulic fluid and attain the shape defined by the dies. The main benefit of this process is that the product will get a very accurate shape. However, there are also some drawbacks. Only profiles with walls of regular thickness can be used, else localized flow of the material will occur. Of the same reason mounting flanges on the profile must be avoided. Mounting details, like bushings, must be welded onto the profile. However, the biggest disadvantage is the high production costs.

One car manufacturer, BMW (Bayerische Motoren Werke, Germany) is currently using the production methods outlined above in some of its models. Suspension components are assembled from several individual pieces. To obtain the accuracy needed for automated welding, some of the pieces are produced by hydro forming. However, the cost of suspension components produced in this way precludes a more widespread use.

Aluminium control arms have also been made as cast/forged aluminium components. This is sometimes a good solution when components with a complex shape are involved. However, the drawback is more limited regulated weight reduction, when the shape has to be solid. Another drawback is that the properties of the materials used in cast/forged processes are generally inferior due to a "short" grain structure, which makes the material brittle.

BRIEF SUMMARY OF THE INVENTION

The present invention has as its objective to provide a control arm for use in wheel suspension units for cars, that is near optimum light in weight, is made from one piece, has no welds and has a aerodynamic shape which prevents the collection of dirt, and is corrosion resistant. A further objective of the present invention is to provide a method for manufacturing suspension components for cars that use cheaper tools than traditional methods, which tools might easily be adjusted to fit changes in the shape of the manufactured component, and which uses only one production line.

These and other objectives are met by a control arm according to the present invention.

In short, the present invention relates to a control arm made from a stock extruded aluminium profile designed in shape and variable wall thickness to make it simple to form and have good performance related to weight, which has a closed shape without any unnecessary openings, and might be produced in a single production line using standard machinery and a limited tool package for the stretch-bending and forming.

DRAWINGS

FIG. 2A is a cross section of FIG. 2 taken along line 2a—2a.

FIG. 3 is a partial view of the top of the other end of the arm with the initial shape shown in phantom lines.

FIG. 3A is a cross section of FIG. 3 taken along lines 3a—3a.

FIG. 3B is a partial view of the side of the arm in FIG. 3.

Figure 4:
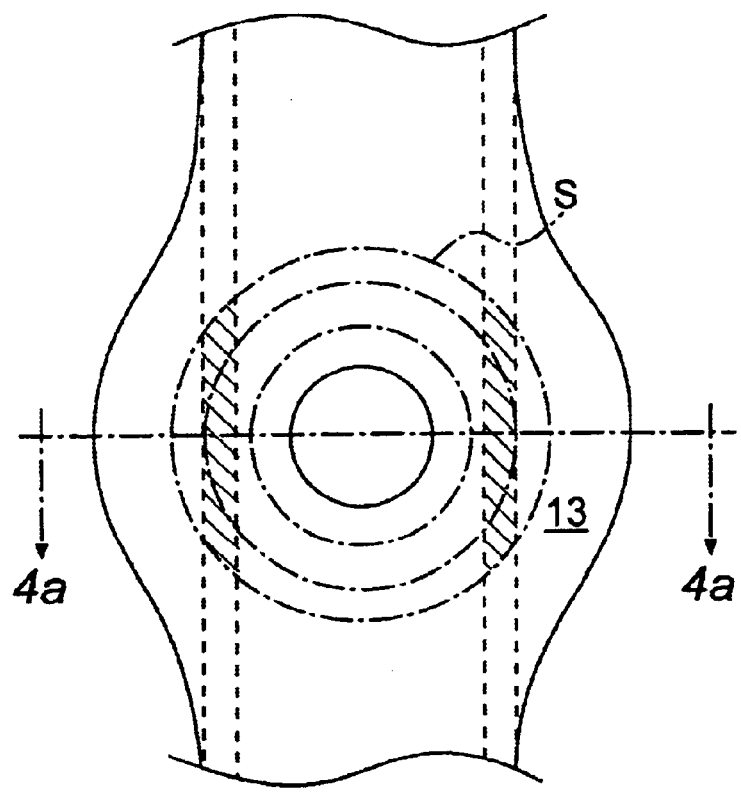
Figure 4A:
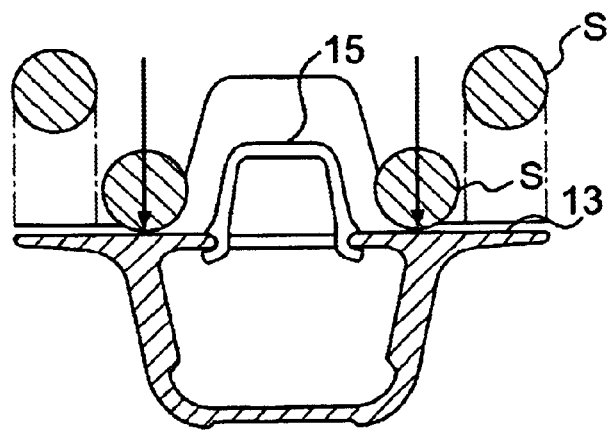

FIGS. 4 and 4A (a cross section along line 4a—4a) shows how the arm is adapted for holding a spring when mounted in the suspension unit of a car.

Figure 5:
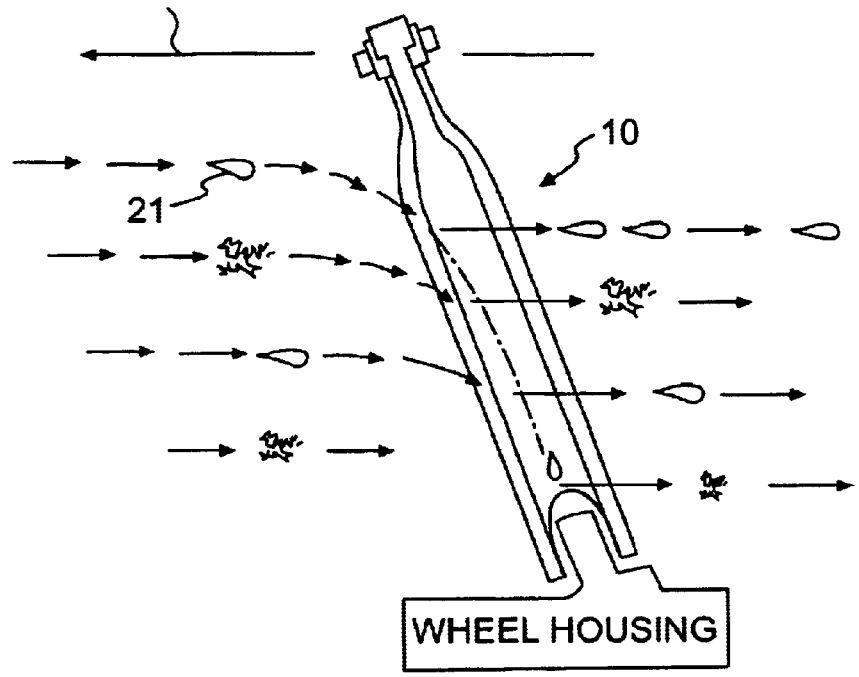
Figure 5A:
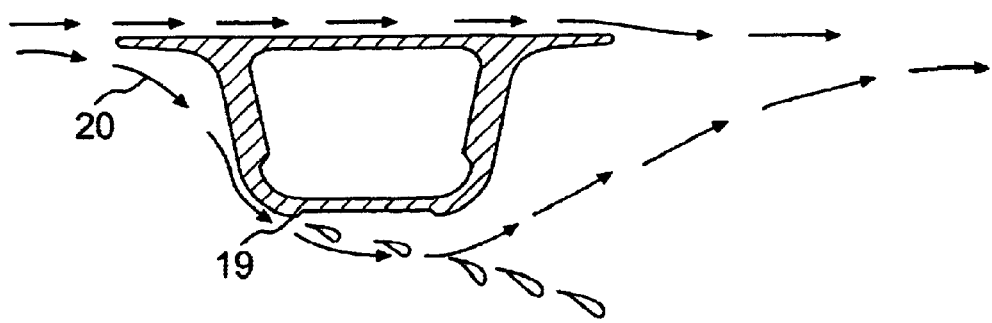

FIGS. 5 and 5A show elements of the arm relating to its specially designed shape for fending off snow and water and for avoiding the build-up of dirt.

DETAILED DESCRIPTION OF THE INVENTION

FIGS. 1A-D show the inventive control arm 10 in overview. The arm 10 is in the form of a bent bar (FIG. 1A) with a fork 11 at one end. The arm 10 has in its central part 12 an expanded portion at the upper surface 13. This part of the arm is intended to support a spring S. A cup-shaped item 15 inserted in a hole in the arm is adapted to hold the spring in place. The other end 16 of the arm 10 has a narrow shape to fit a corresponding support point of the car (not shown).

The arm 10 is made from a closed profile of high strength aluminium. The profile is cut into its proper length, and shaped by stretch-bending, pressing and punching. Openings in the construction, like those of the forked end 11, are cut. Other superfluous material is cut away, to define the outer shape of the arm in the area 12 intended for supporting the spring. Holes H1, H2, etc., are punched in the arm 10, and finally the cup-shaped item 15 is inserted in its corresponding hole.

The arm 10 is produced by a cold process, avoiding heating, forging or welding, and involving only standard machinery. Thus, costly presses are dispensed with. In addition, due to the corrosion resistant properties of the aluminium material, painting or other surface treatment is unnecessary. Altogether this results in a manufacturing process involving a single production line. The manufacturing process is easily and rapidly changed, e.g. if it is desirable to change the form and cross section of the arm.

Figure 1A:
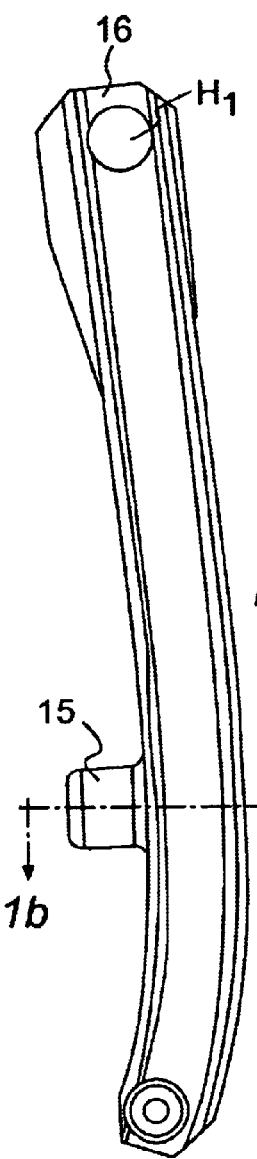
FIG. 1A is a side view of the arm.
Figure 1B:
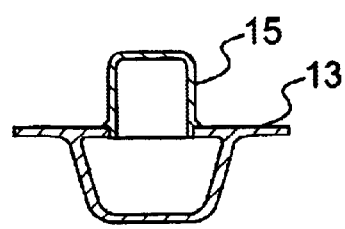
FIG. 1B is a cross section along line 1b—1b in FIG. 1A.
Figure 1C:
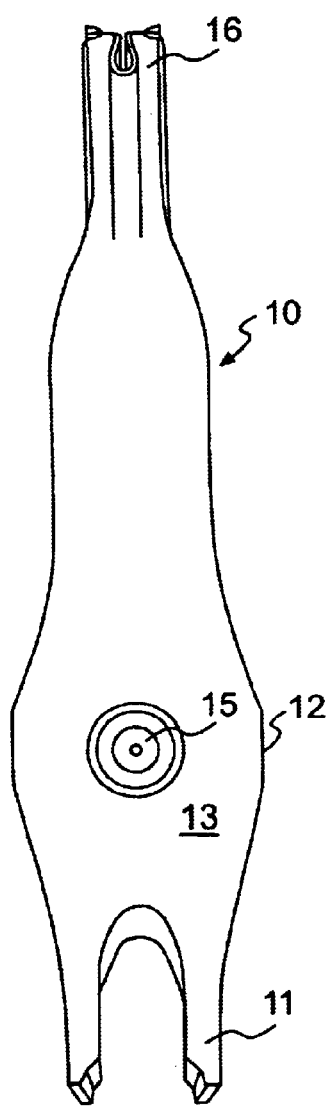
FIG. 1C is a view from above.
Figure 1D:
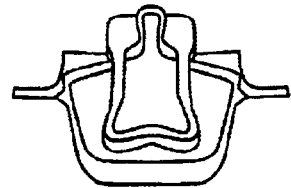
FIG. 1D is a view of the arm as seen from one end of the arm in FIG. 1C.
Figure 2:
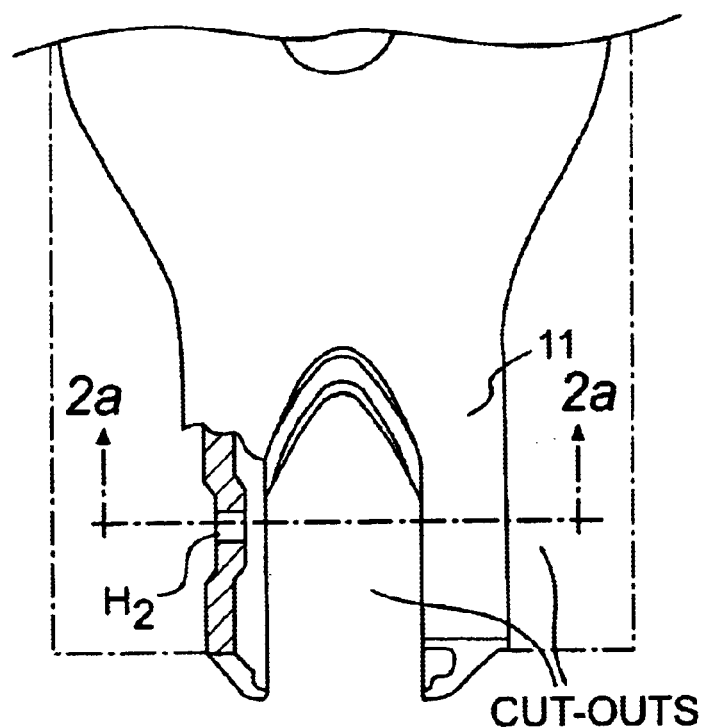
FIG. 2 is a partial view with a portion broken away of the fork-shaped end of the arm with the initial shape shown in phantom lines.
Figure 2A:
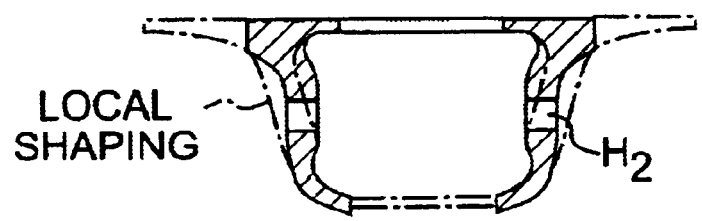

The profile itself is designed in a such way that, while it has a weight-optimised cross section, it also has a form which with simple pressing and cutting produces a properly designed fork 11 in the one end (FIGS. 2 and 2A), an attachment for a cup 15 in the central part 12 (FIG. 1B), and a support face 13 for a helical spring S (FIG. 4A).

Adjacent walls of the profile have unequal thickness, as shown on FIG. 3A. Here the top and bottom walls 16 and 17, respectively, are thinner than the side walls 18. In the manufacturing process, when localised pressure is applied to the side walls 18, the top and bottom walls easily give in and get a proper shape.

As the arm 10 is designed in such a way that only localised shaping in each end is required, the support arm gets "clean", smooth surfaces. In addition, the profile stock has a cross section (see FIG. 5A) with an especially designed rib 19. The rib 19 is designed to direct the stream of air 20 around the control arm 10 in such a way that water and snow 21 are "torn" away from the arm 10 and not conducted towards the wheel housing (FIG. 5). The water/snow 21 is conducted around the arm 10 until it meets the rib 19, which has an escarpment where the water leaves the arm (see FIG. 5A). The escarpment has a function similar to that of the throating below a window.

Control arms are normally mounted at an inclined angle in relatation to the wheel, which has the effect of leading water and debris toward the wheel housing.

The inventive shape of the control arm prevents water from being conducted along the arm (FIGS. 5 and 5A).

What is claimed is:

1. A method for manufacturing a control arm for a wheel suspension of a car, the method involves producing the arm from a single piece of a hollow closed profile of high strength extruded aluminum, characterized in:

producing the arm from a profile in which adjacent walls are of different thickness, shaping the profile, using only external mechanical cold processing involving stretch-bending, pressing, cutting and punching.

2. A method as claimed in claim 1, characterized in that the arm is produced from a profile of trapezoidal cross-section, with a bottom wall, non-parallel side walls and a top wall parallel with the bottom wall and of broader dimensions than said bottom wall, and with flanges on both sides of the profile in the extension of said top wall, which flanges defines the maximum width of the finished arm.

3. A method as claimed in claim 2, characterized in that the arm is produced from a profile in which the top and bottom walls are of smaller thickness than the side walls.

4. A method according to claim 3, characterized in that said flanges are trimmed to form a support face for a spring, a first end of the profile is pressed and openings cut to form a fork, at a second end of the profile localized pressure is applied to narrow the shape to fit a corresponding support point of the car, and holes are punched in the arm.

5. A method according to claim 4, characterized in that said flanges are trimmed to form a support face for a spring, a first end of the profile is pressed and openings cut to form a fork, at a second end of the profile localized pressure is applied to narrow the shape to fit a corresponding support point of the car, and holes are punched in the arm.

6. A method as claimed in claim 1, characterized in that a rib is formed on the outer surface of said arm to fend off air, water and snow.

* * * * *